United States Patent
Boyd et al.

(10) Patent No.: US 7,350,800 B2
(45) Date of Patent: Apr. 1, 2008

(54) AIR BAG INFLATOR VIBRATION DAMPER

(75) Inventors: Ted Boyd, Knoxville, TN (US); Mike Strong, Knoxville, TN (US); Venny Sneed, Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 63 days.

(21) Appl. No.: 11/398,752

(22) Filed: Apr. 6, 2006

(65) Prior Publication Data

US 2007/0235989 A1    Oct. 11, 2007

(51) Int. Cl.
   *B60R 21/16*    (2006.01)
(52) U.S. Cl. .................................................. 280/728.2
(58) Field of Classification Search ............. 280/728.2, 280/731
   See application file for complete search history.

(56) References Cited

U.S. PATENT DOCUMENTS

| | | | |
|---|---|---|---|
| 4,988,119 A | 1/1991 | Hartmeyer et al. | |
| 5,683,100 A | 11/1997 | Enders | |
| 6,164,689 A | 12/2000 | Rivin | |
| 6,435,540 B1 * | 8/2002 | Durre | 280/728.2 |
| 6,439,599 B1 * | 8/2002 | Laue et al. | 280/731 |
| 6,695,343 B1 | 2/2004 | Christiansen | |
| 6,712,383 B2 | 3/2004 | Asic | |
| 7,172,208 B2 * | 2/2007 | Lodholz et al. | 280/728.2 |
| 2003/0038459 A1 * | 2/2003 | Leibach et al. | 280/728.2 |
| 2003/0038462 A1 * | 2/2003 | Leibach et al. | 280/731 |
| 2003/0116948 A1 * | 6/2003 | Back et al. | 280/731 |
| 2003/0214119 A1 * | 11/2003 | Grossmann et al. | 280/728.2 |

* cited by examiner

*Primary Examiner*—Paul N. Dickson
*Assistant Examiner*—Robert A. Coker
(74) *Attorney, Agent, or Firm*—Nixon & Vanderhye, P.C.

(57) ABSTRACT

A vibration damper for connecting an inflator to an air bag module in a vehicle steering column or the like. The vibration damper comprises a flexible and resilient, annular damper member having a first end portion connected to a first ring member, and a second opposite end portion connected to a second ring member. The first ring member comprises a plurality of upwardly extending projections that are constructed to be inserted through aligned openings in a diffuser and then deformed to connect the first ring member to the diffuser. The second ring member comprises a plurality of downwardly extending projections that are constructed to be inserted through aligned openings in a mounting flange for an airbag module and then deformed to connect the second ring member to the mounting flange.

16 Claims, 2 Drawing Sheets

AIR BAG INFLATOR VIBRATION DAMPER

BACKGROUND OF THE INVENTION

1. Field of the Invention

The present invention relates to a vibration damper for an airbag inflator and, more particularly, to such a vibration damper which is positioned between an inflator and an airbag module in a steering column of a motor vehicle.

2. Description of Related Art

The vibrations that arise in motor vehicles during movement or idling thereof with the motor running are, in many cases, transmitted to the steering column and then to the steering wheel. To dampen these vibrations at the steering wheel and to improve driving comfort, various types of vibration damper devices have been mounted within the steering column. In some cases, the vibration damper device has been integrated with the airbag inflator assembly mounted within the steering column and, in other cases, it has been separate therefrom.

Such vibration damper devices have been subject to one or more of the following disadvantages:

1. They have been complicated in construction;
2. They have been difficult to install;
3. They have been difficult and/or expensive to manufacture;
4. They have been unreliable in operation; and/or
5. They have occupied too much space in the steering column.

The vibration damper of the present invention is not subject to any of the above-mentioned disadvantages and possesses certain advantages that are not found in prior art damper devices of the same general type.

SUMMARY OF THE INVENTION

The vibration damper of the present invention comprises an annular, flexible and resilient damper member formed of any suitable material such as rubber, thermoplastic elastomers, or thermoset elastomers. The damper member may be cylindrical or may have any other suitable shape. It is attached at its ends in any suitable manner to two substantially rigid ring members formed of any suitable material, e.g., a metal such as steel or aluminum. As an illustrative example, the damper member may be molded to the ring members.

One of the ring members comprises a plurality of upwardly extending projections that extend through aligned openings in an annular flange at the lower end of the diffuser of an air bag and are deformed to connect the one ring member to the diffuser.

The other ring member comprises a plurality of downwardly extending projections that extend through aligned openings in a mounting flange of any suitable shape or construction for connecting the damper and inflator to the air bag module in the steering column. The downwardly extending projections are deformed after being extended through the aligned openings in the mounting flange to connect the other ring member thereto.

This damper construction allows the inflator some freedom of movement so as to dampen vibration in the steering column and to eliminate the need for a separate damper system within the steering column. Also, the damper of the present invention can be mounted or installed after the inflator assembly is completed to thereby alleviate any concern for the potential in some cases of Helium mass spec inaccuracy that may be caused by the presence of elastic material on the exterior of the inflator during the manufacture thereof.

DETAILED DESCRIPTION OF THE INVENTION

Referring to FIGS. 1-4, the vibration damper 10 of the present invention generally comprises an annular, flexible and resilient damper member 12 that is secured at its ends to first and second, substantially rigid ring members 14 and 16, respectively. The purpose of the vibration damper 10 is to connect an inflator to an air bag module in a motor vehicle steering column or the like so as to allow the inflator some freedom of movement to dampen vibration in the steering column.

Figure 1:
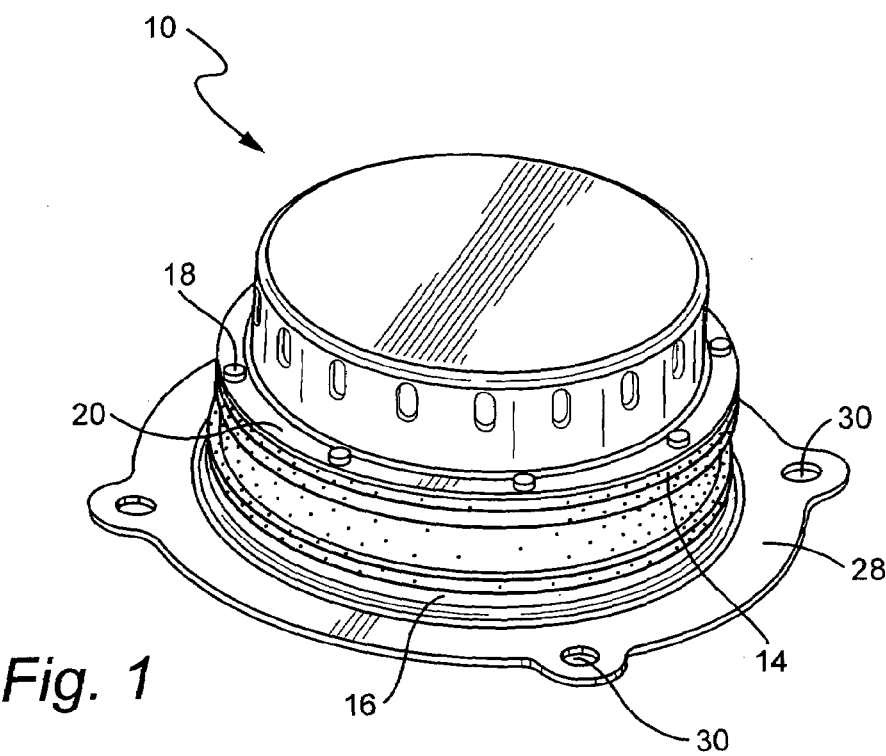
FIG. 1 is a perspective view of the upper portion of one embodiment of the vibration damper of the present invention.
Figure 2:
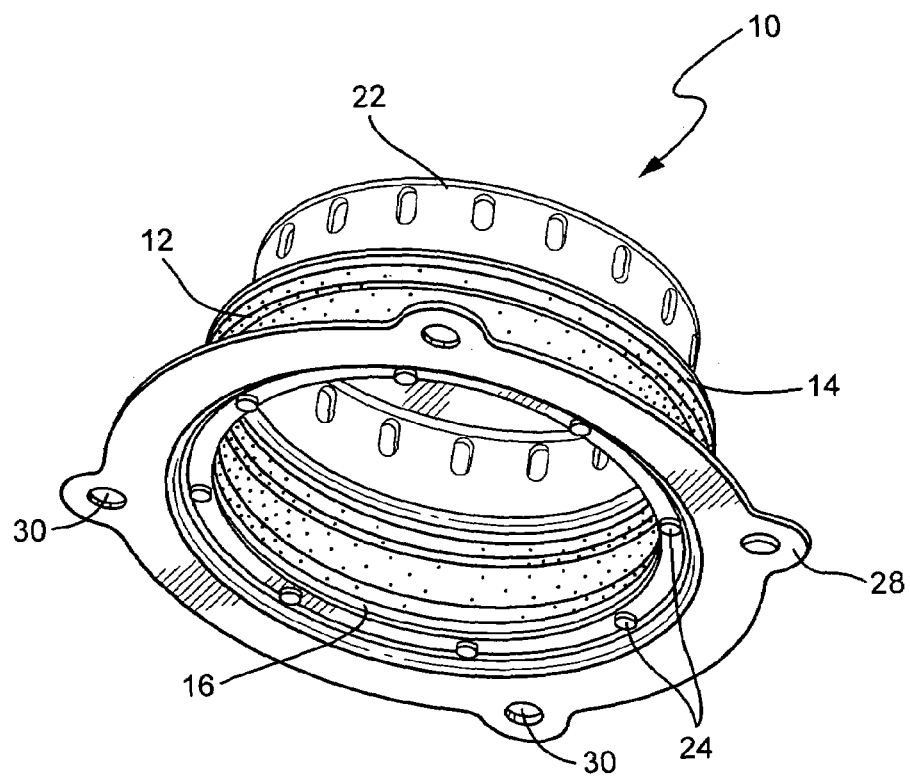
FIG. 2 is a perspective view of the lower portion of the vibration damper shown in FIG. 1.
Figure 3:
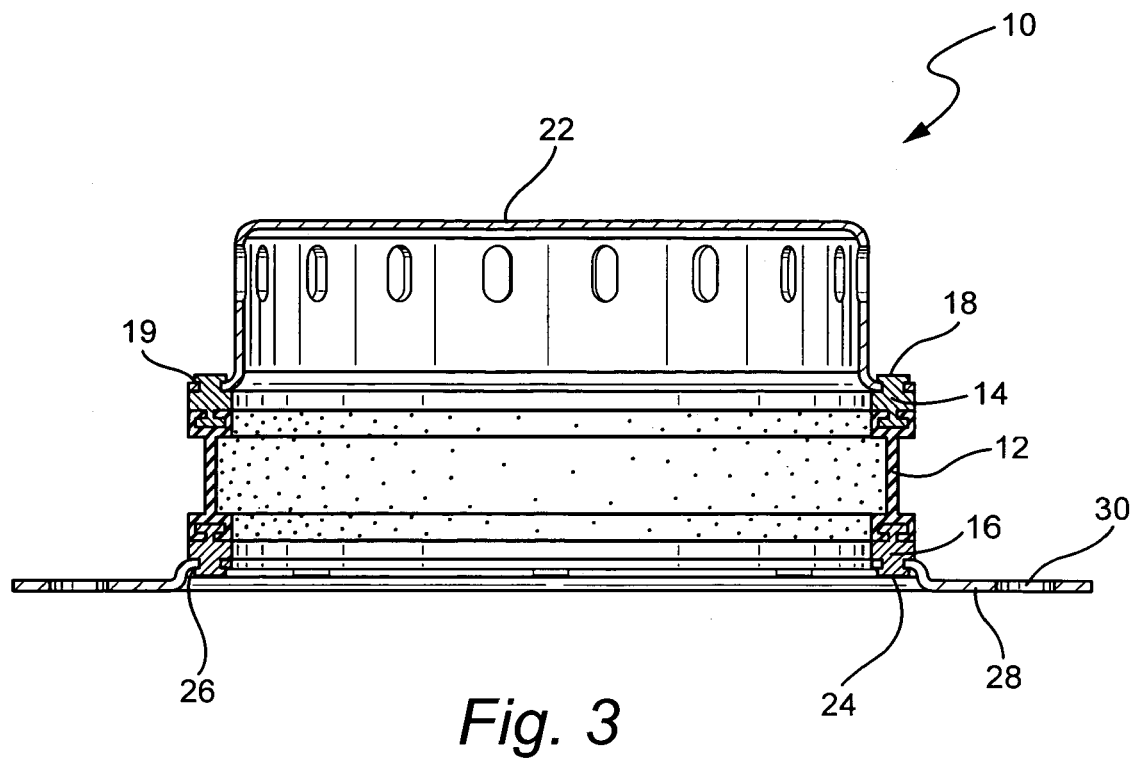
FIG. 3 is a side elevational view in section of the vibration damper shown in FIGS. 1 and 2.
Figure 4:
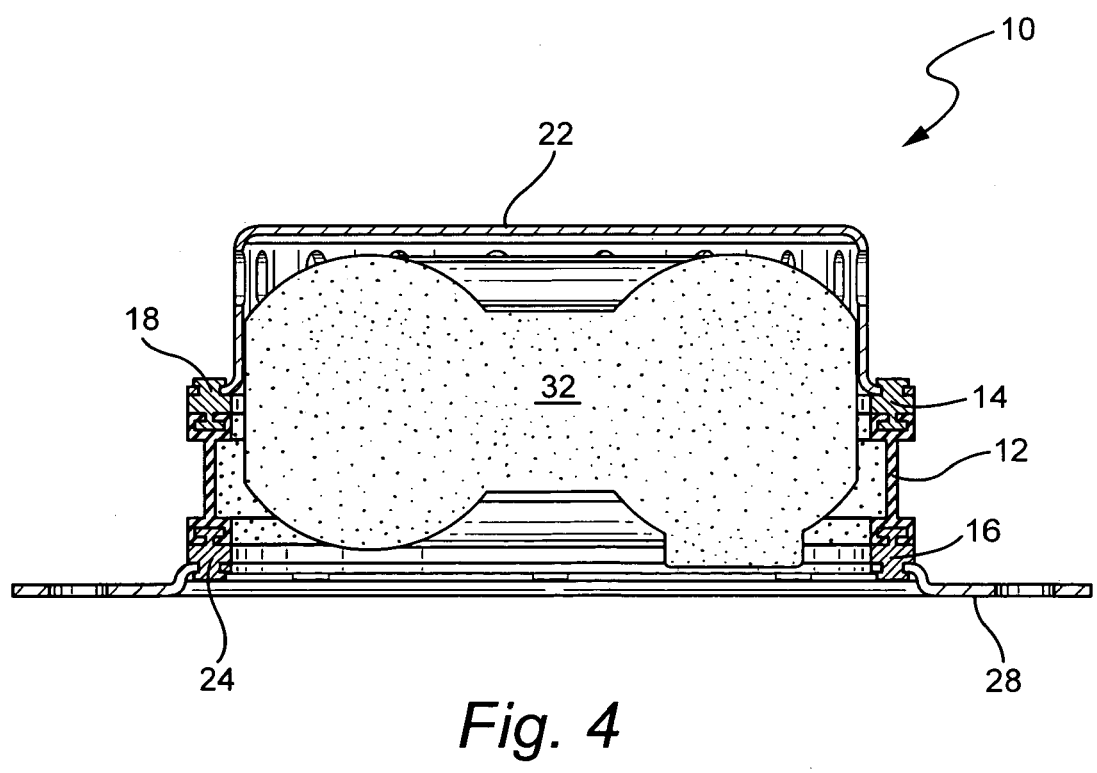
FIG. 4 is a side elevational view in section similar to FIG. 3 showing the vibration damper connected to an inflator.

As shown in FIGS. 3 and 4, the damper member 12 may be cylindrical or may have any other suitable annular shape. The damper member 12 may be formed of any suitable, flexible and resilient material such as rubber, thermoplastic elastomers, or thermoset elastomers.

At a first end portion, the damper member 12 is secured in any suitable manner, such as by molding, to the first ring member 14 which is formed of any suitable substantially rigid and deformable material, e.g., a metal such as aluminum or steel, or a suitable plastic material such as nylon, glass filed nylon, polypropylene, or glass filled polypropylene. As shown in FIG. 3, the first ring member 14 comprises a plurality of upwardly extending projections 18 that extend through aligned openings 19 in an annular flange 20 of the diffuser 22 for an inflator. The projections 18 are deformed in any suitable manner after being extended through the openings 19 to connect the first ring member 14 to the diffuser 22.

The second end portion of the damper member 12 is connected to the second ring member 16 in any suitable manner, such as by molding. The second ring member 16 comprises a plurality of downwardly extending projections 24 that extend through aligned openings 26 in a mounting flange 28 of any suitable shape for connecting the damper 10 and inflator to an air bag module (not shown). The projections 24 are deformed in any suitable manner after being extended through the openings 26 to connect the second ring member to the mounting flange 28. Apertures 30 may be provided in the mounting flange 28 to facilitate its connection to an airbag module (not shown). The second ring member 16 may be formed of any suitable substantially rigid and deformable material, e.g., a metal such as aluminum or steel, or a suitable plastic such as nylon, polypropylene, or glass filled polypropylene.

FIG. 4 shows the inflator 32 mounted within the diffuser 22 and the damper 10 in any suitable manner.

From the foregoing description, it will be apparent that the present invention provides a simple and effective vibration damper that may be easily installed in a motor vehicle steering column to allow the inflator some freedom of movement relative to the air bag module, and thereby dampen vibration in the steering column.

Advantageously, the damper 10 of the present invention can be mounted or installed after the inflator assembly is completed to thereby alleviate any concern for the potential in some cases of Helium mass spec inaccuracy that may be caused by the presence of elastic material on the exterior of the inflator during the manufacture thereof.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vibration damper for connecting an inflator to an air bag module in a vehicle steering column, said vibration damper comprising:
    a flexible and resilient annular damper member having a first end portion and a second opposite end portion;
    a first ring member connected to the first end portion of said damper member, said first ring member comprising a plurality of upwardly extending projections that are constructed to be inserted through aligned openings in a diffuser and then deformed to connect the first ring member to the diffuser; and
    a second ring member connected to the second end portion of said damper member, said second ring member comprising a plurality of downwardly extending projections that are constructed to be inserted through aligned openings in a mounting flange for an air bag module and then deformed to connect the second ring member to the mounting flange.

2. The vibration damper of claim 1, wherein said damper member is cylindrical.

3. The vibration damper of claim 1, wherein said damper member is formed of rubber, thermoplastic elastomer, or thermoset elastomer.

4. The vibration damper of claim 1, wherein said first ring member and said second ring member are formed of a substantially rigid and deformable material.

5. The vibration damper of claim 4, wherein said first ring member and said second ring member are formed of steel or aluminum.

6. The vibration damper of claim 1, wherein said damper member is molded to said first ring member and to said second ring member.

7. The vibration damper of claim 1, wherein the projections on said first ring member and said second ring member are uniformly spaced thereon.

8. An inflator construction for an air bag module in a vehicle steering column, said inflator construction comprising:
    a diffuser having an outwardly extending annular flange with openings therethrough;
    a vibration damper connected to said diffuser, said vibration damper comprising a flexible and resilient annular damper member having a first end portion and a second end portion, a first ring member connected to said first end portion, said first ring member comprising a plurality of upwardly extending projections that extend through said diffuser flange openings and are deformed to connect said first ring member to said diffuser; and
    a mounting flange for connecting said damper to an air bag module, said mounting flange having openings therethrough; and
    a second ring member connected to said second end portion, said second ring member comprising a plurality of downwardly extending projections that extend through said mounting flange openings and are deformed to connect said second ring member to said mounting flange.

9. The inflator construction of claim 8, wherein said damper member is cylindrical.

10. The inflator construction of claim 8, wherein said damper member is formed of rubber, thermoplastic elastomer, or thermoset elastomer.

11. The inflator construction of claim 8, wherein said annular flange is located at a lower end of said diffuser.

12. The inflator construction of claim 8, wherein said damper member is molded to said first ring member and to said second ring member.

13. The inflator construction of claim 8 wherein said first ring member and said second ring member are formed of a substantially rigid and deformable material.

14. The inflator construction of claim 8, wherein said mounting flange has a plurality of apertures therethrough to facilitate the connection of said mounting flange to an air bag module.

15. The inflator construction of claim 8, wherein said projections on said first ring member are uniformly spaced thereon.

16. The inflator construction of claim 8, wherein said projections on said second ring member are uniformly spaced thereon.

* * * * *